(12) United States Patent
Clark

(10) Patent No.: US 7,932,851 B1
(45) Date of Patent: Apr. 26, 2011

(54) RANGING SIGNAL STRUCTURE WITH HIDDEN ACQUISITION CODE

(75) Inventor: James M. Clark, Verona, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 2531 days.

(21) Appl. No.: 10/280,043

(22) Filed: Oct. 15, 2002

(51) Int. Cl.
*H04K 1/00* (2006.01)
*G01S 7/02* (2006.01)
*G01S 7/00* (2006.01)

(52) U.S. Cl. ............ 342/14; 342/13; 342/16; 342/175; 342/195; 380/255; 380/287; 380/59

(58) Field of Classification Search ............ 342/82, 342/89, 175, 195; 380/255, 59
See application file for complete search history.

(56) References Cited

U.S. PATENT DOCUMENTS

| | | | | |
|---|---|---|---|---|
| 5,577,122 A * | 11/1996 | Schipper et al. | ................ | 380/28 |
| 5,640,452 A * | 6/1997 | Murphy | ........................ | 380/258 |
| 5,734,721 A | 3/1998 | Clark | | |
| 5,898,680 A * | 4/1999 | Johnstone et al. | ............ | 380/258 |
| 6,334,187 B1 * | 12/2001 | Kadono | ........................ | 380/269 |
| 7,400,727 B2 * | 7/2008 | Kadono | ........................ | 380/203 |
| 2001/0032313 A1 * | 10/2001 | Haitsma et al. | ................ | 713/176 |
| 2001/0052076 A1 * | 12/2001 | Kadono | ........................ | 713/176 |
| 2003/0040326 A1 * | 2/2003 | Levy et al. | ..................... | 380/247 |

FOREIGN PATENT DOCUMENTS

EP 1020848 A2 * 7/2000
WO WO 02/13436 A1 * 2/2002

* cited by examiner

*Primary Examiner* — Bernarr E Gregory
(74) *Attorney, Agent, or Firm* — Buchanan Ingersoll & Rooney PC

(57) ABSTRACT

A method and apparatus for generating a data structure to be embedded in a ranging signal or in a synchronization preamble of a digital signal are disclosed. In a preferred embodiment, a plurality of blocks 0 through i, where i is an integer, are formed from random sequences of components A0 to Ai, each of the components being N bits, and each block including A0 through Ai components. A plurality of random sequences of components B0 through Bi, where i is an integer, of 2N bits is also formed. The components A0 through Ai in blocks 0 to i are formed into a matrix and the polarities of the components A0 through Ai are made to correspond to the polarities of a Hadamard matrix. The components A0 through Ai of each block are randomly permuted with components B0 through Bi. When the permuted components of the blocks are embedded in a ranging signal or in a synchronization preamble of a signal, the blocks will appear to an unauthorized user of the signal as being unrelated.

27 Claims, 15 Drawing Sheets

First block:

| A0 = N random bits | A1 = another N random bits |
|---|---|

Second block:

| A0 bits again | A1 bits again, inverted = -A1 |
|---|---|

(S) Figure 1

First block:

| A0 = N random bits | A1 = another N random bits |
|---|---|
| Randomly permute A0 and A1, and send as first block. ||

Second block:

| A0 bits again | A1 bits again, inverted = -A1 |
|---|---|
| Randomly permute A0 and -A1, and send as second block. (Use same permutation.) ||

(S) Figure 2

First block:

| A0 = N random bits | A1 = another N random bits |
|---|---|
| B0 = 2N random bits ||
| Randomly permute A0, A1, and B0, and send as first block. ||

Second block:

| A0 bits again | A1 bits again, inverted = -A1 |
|---|---|
| B1 = another 2N random bits (no repeat) ||
| Randomly permute A0, -A1, and B1, and send as second block. (Repeat permutation.) ||

(S) Figure 3

| | Block Definition | | Combinatorial Analysis | | |
|---|---|---|---|---|---|
| | Block A | Block B | A | B | Random Counts |
| 1 | N random chips: A0 = 01101011 | Repeat with same polarity: A0 = 01101011 | 0<br>1 | 0<br>1 | N - R1<br>R1 |
| 2 | N random chips: A1 = 10101000 | Repeat with opposite polarity: -A1 = 01010111 | 0<br>1 | 1<br>0 | N - R2<br>R2 |
| 3 | 2N random chips: B0 = 00011100 10110110 | 2N new random chips: (non-repeating) B1 = 11000101 00101110 | 0<br>0<br>1<br>1 | 0<br>1<br>0<br>1 | 2N - R3 - R4 - R5<br>R3<br>R4<br>R5 |
| 4 | Randomly permuted sequence of components A0, A1, and B0 | Same permutation, of components A0, -A1, and B1 | 0<br>0<br>1<br>1 | 0<br>1<br>0<br>1 | 3N - R1 - R3 - R4 - R5<br>C1 = R3 + N - R2<br>C2 = R4 + R2<br>C3 = R5 + R1 |

(S) Figure 4

| 1 dimension | | 2 dimensions | | | | 3 dimensions | | | | | | | |
|---|---|---|---|---|---|---|---|---|---|---|---|---|---|
| 0 | 1 | 0 | 1 | 2 | 3 | 0 | 1 | 2 | 3 | 4 | 5 | 6 | 7 |
| + | + | + | + | + | + | + | + | + | + | + | + | + | + |
| + | − | + | − | + | − | + | − | + | − | + | − | + | − |
| | | + | + | − | − | + | + | − | − | + | + | − | − |
| | | + | − | − | + | + | − | − | + | + | − | − | + |
| | | | | | | + | + | + | + | − | − | − | − |
| | | | | | | + | − | + | − | − | + | − | + |
| | | | | | | + | + | − | − | − | − | + | + |
| | | | | | | + | − | − | + | − | + | + | − |

(S) Figure 5

| decimal integer | binary integer 4 2 1 | polarity pattern 4 2 1 |
|---|---|---|
| 0 | 0 0 0 | + + + |
| 1 | 0 0 1 | + + − |
| 2 | 0 1 0 | + − + |
| 3 | 0 1 1 | + − − |
| 4 | 1 0 0 | − + + |
| 5 | 1 0 1 | − + − |
| 6 | 1 1 0 | − − + |
| 7 | 1 1 1 | − − − |

(S) Figure 6

| A | B | A+B |
|---|---|-----|
| 0 | 0 | 0 |
| 0 | 1 | 1 |
| 1 | 0 | 1 |
| 1 | 1 | 0 |

| A | B | A+B |
|---|---|-----|
| + | + | + |
| + | − | − |
| − | + | − |
| − | − | + |

| A | B | A+B |
|---|---|-----|
| +1 | +1 | +1 |
| +1 | −1 | −1 |
| −1 | +1 | −1 |
| −1 | −1 | +1 |

(S) Figure 7

| block 0 | block 1 |
|---------|---------|
| +A0 | +A0 |
| +A1 | −A1 |
| B0 | B1 |

(S) Figure 8

| block 0 | block 1 | block 2 | block 3 |
|---------|---------|---------|---------|
| +A0 | +A0 | +A0 | +A0 |
| +A1 | -A1 | +A1 | -A1 |
| +A2 | +A2 | -A2 | -A2 |
| +A3 | -A3 | -A3 | +A3 |
| B0 | B1 | B2 | B3 |

(S) Figure 9

| block 0 | block 1 | block 2 | block 3 | block 4 | block 5 | block 6 | block 7 |
|---------|---------|---------|---------|---------|---------|---------|---------|
| +A0 | +A0 | +A0 | +A0 | +A0 | +A0 | +A0 | +A0 |
| +A1 | -A1 | +A1 | -A1 | +A1 | -A1 | +A1 | -A1 |
| +A2 | +A2 | -A2 | -A2 | +A2 | +A2 | -A2 | -A2 |
| +A3 | -A3 | -A3 | +A3 | +A3 | -A3 | -A3 | +A3 |
| +A4 | +A4 | +A4 | +A4 | -A4 | -A4 | -A4 | -A4 |
| +A5 | -A5 | +A5 | -A5 | -A5 | +A5 | -A5 | +A5 |
| +A6 | +A6 | -A6 | -A6 | -A6 | -A6 | +A6 | +A6 |
| +A7 | -A7 | -A7 | +A7 | -A7 | +A7 | +A7 | -A7 |
| B0 | B1 | B2 | B3 | B4 | B5 | B6 | B7 |

(S) Figure 10

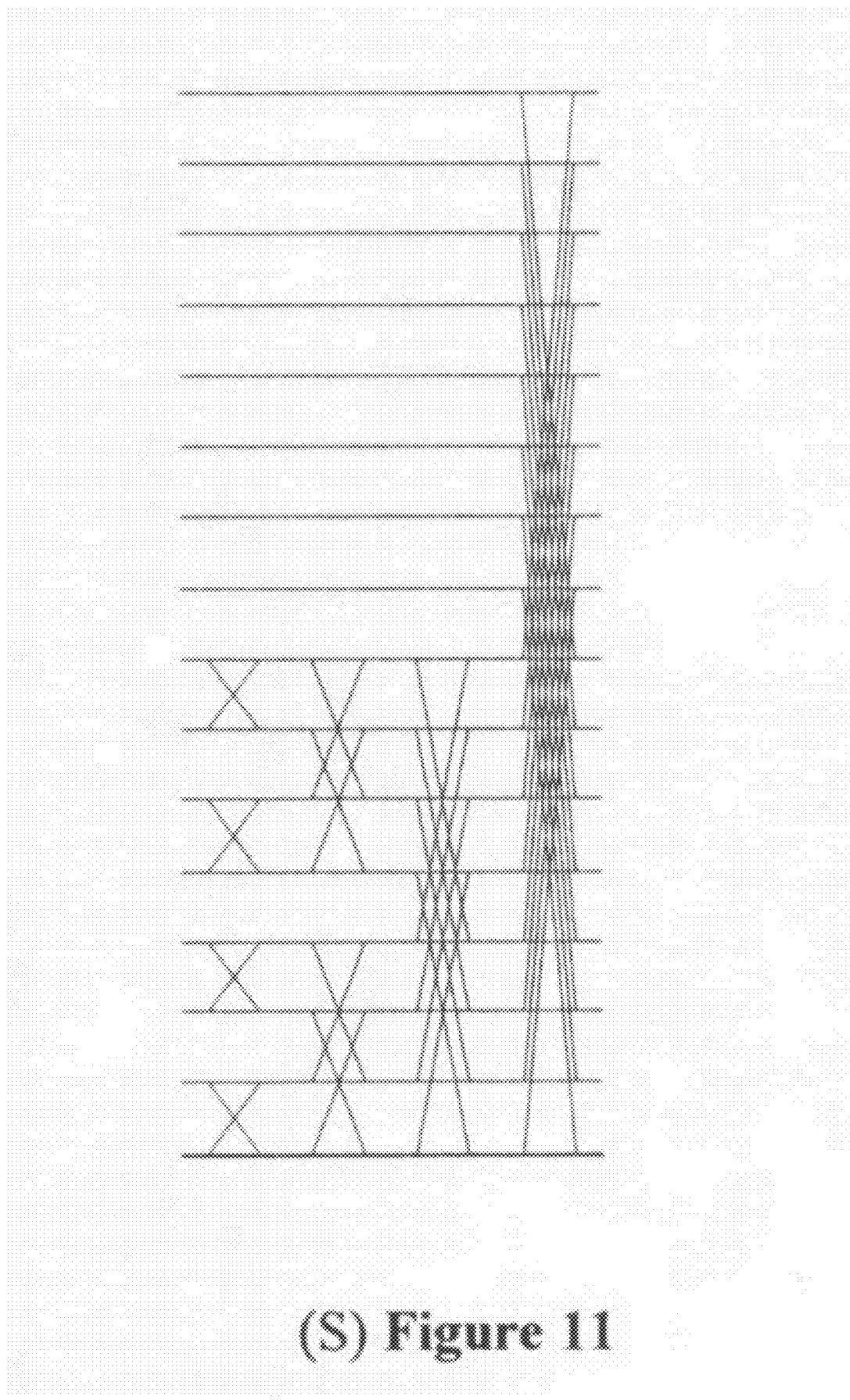
(S) Figure 11

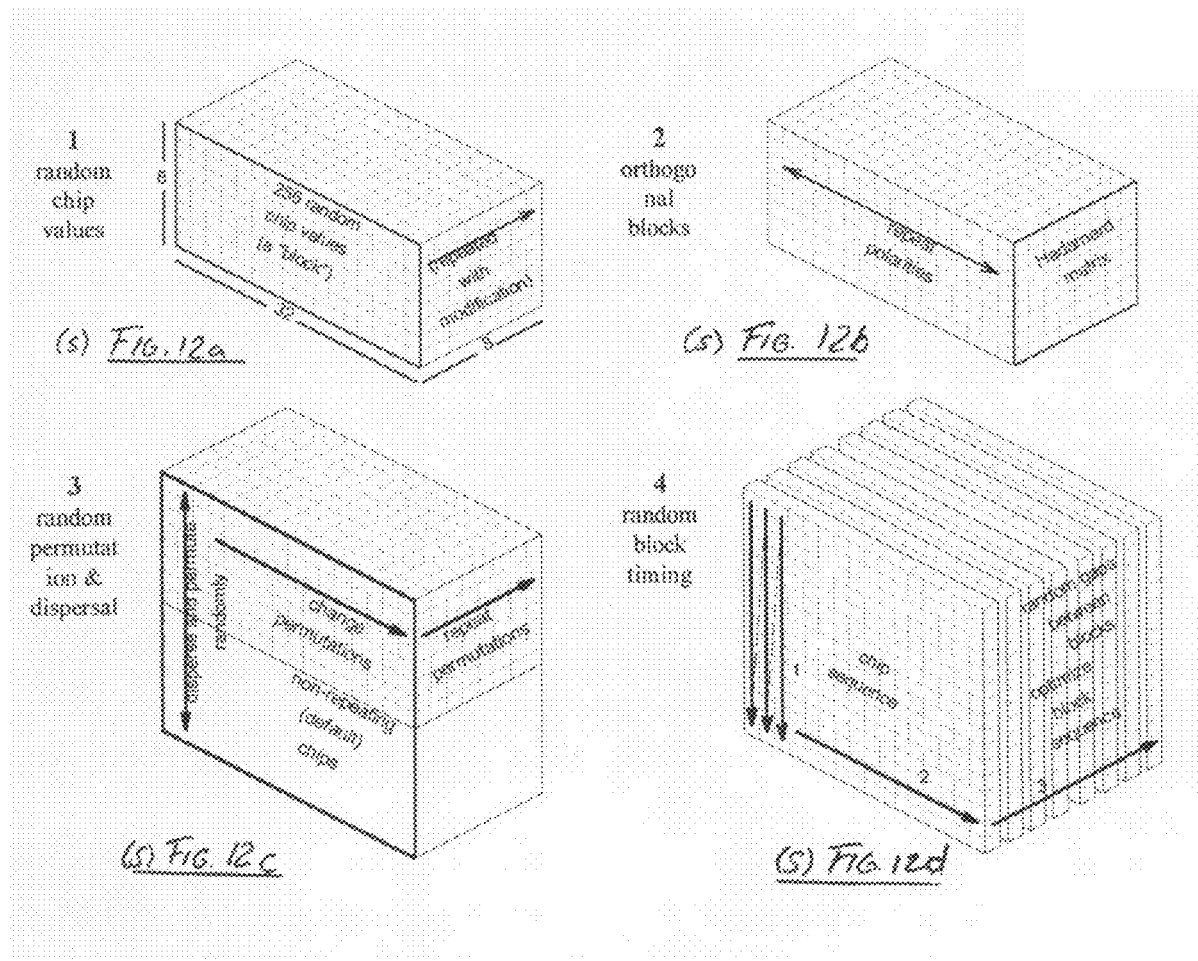

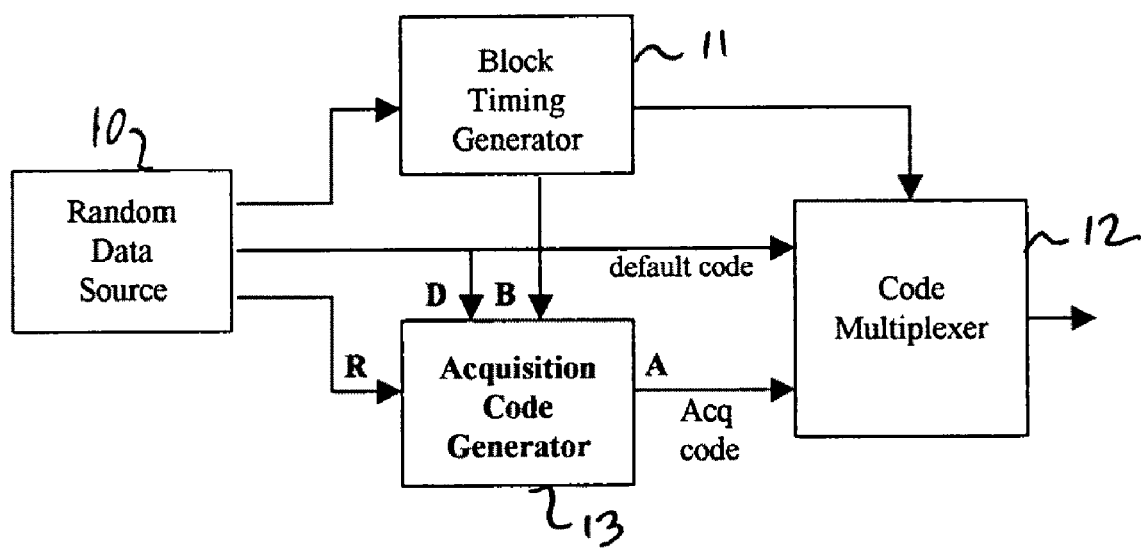
(S) Figure 13

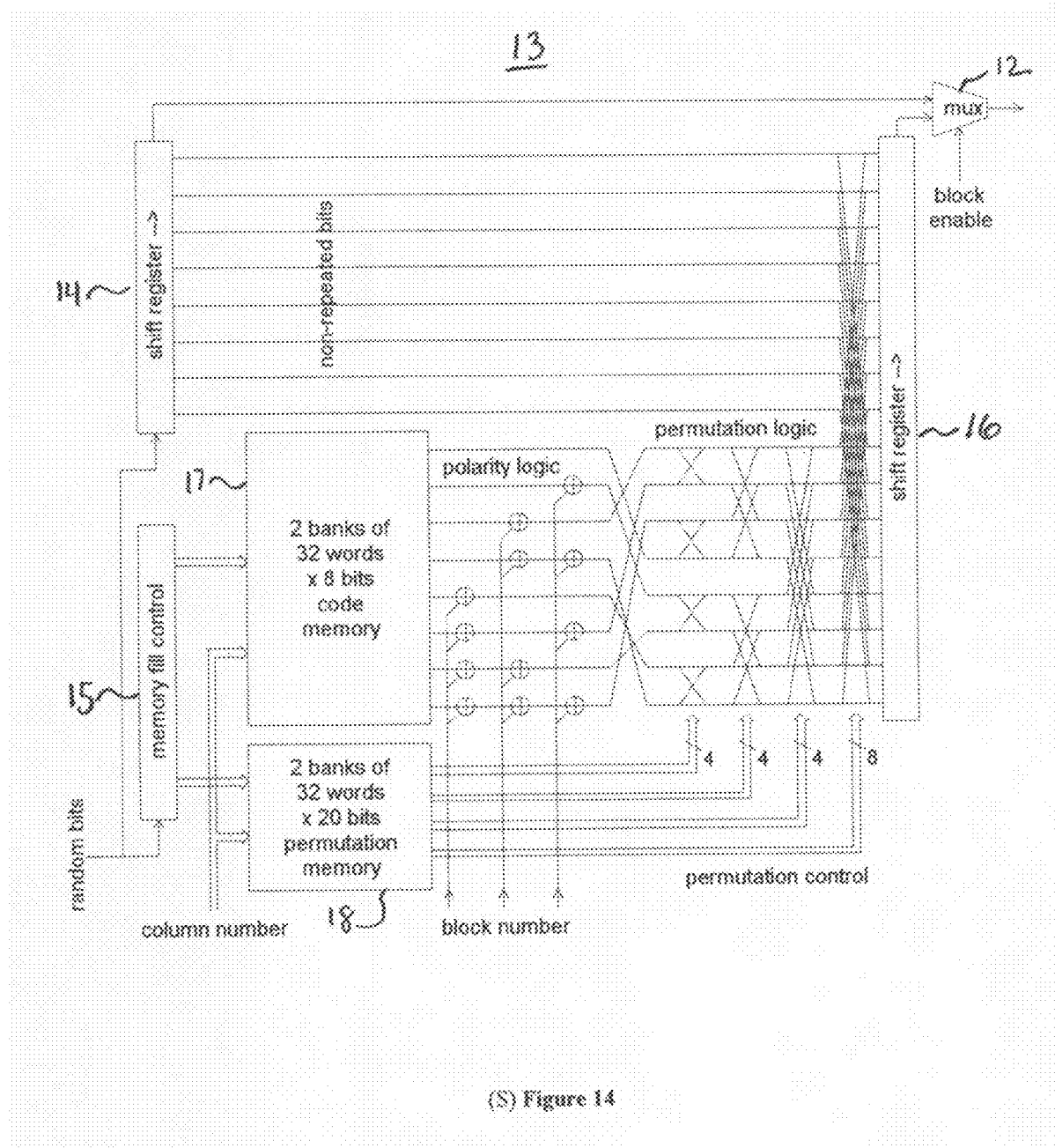
(S) Figure 14

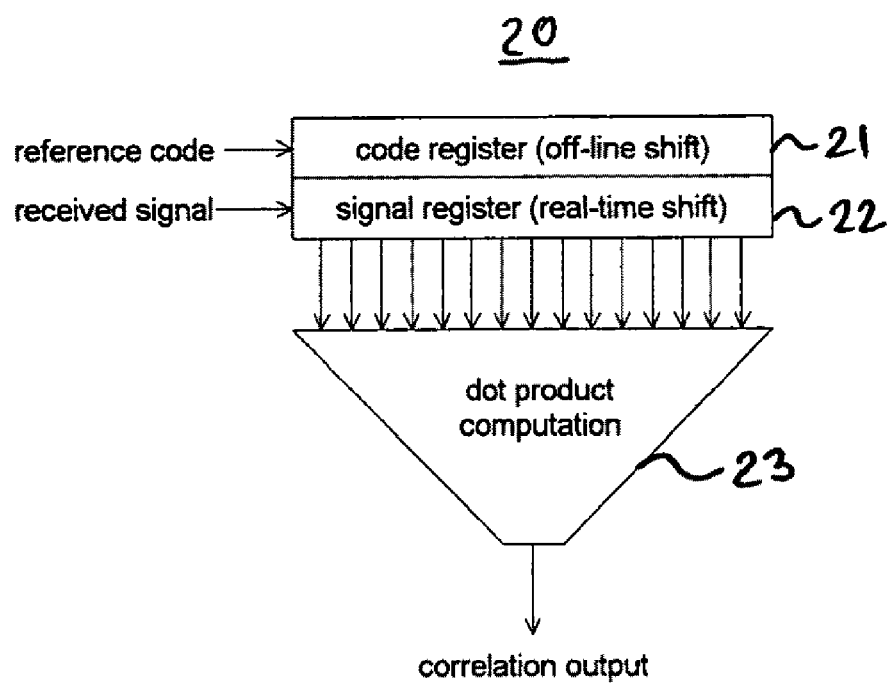
(U) Figure 15

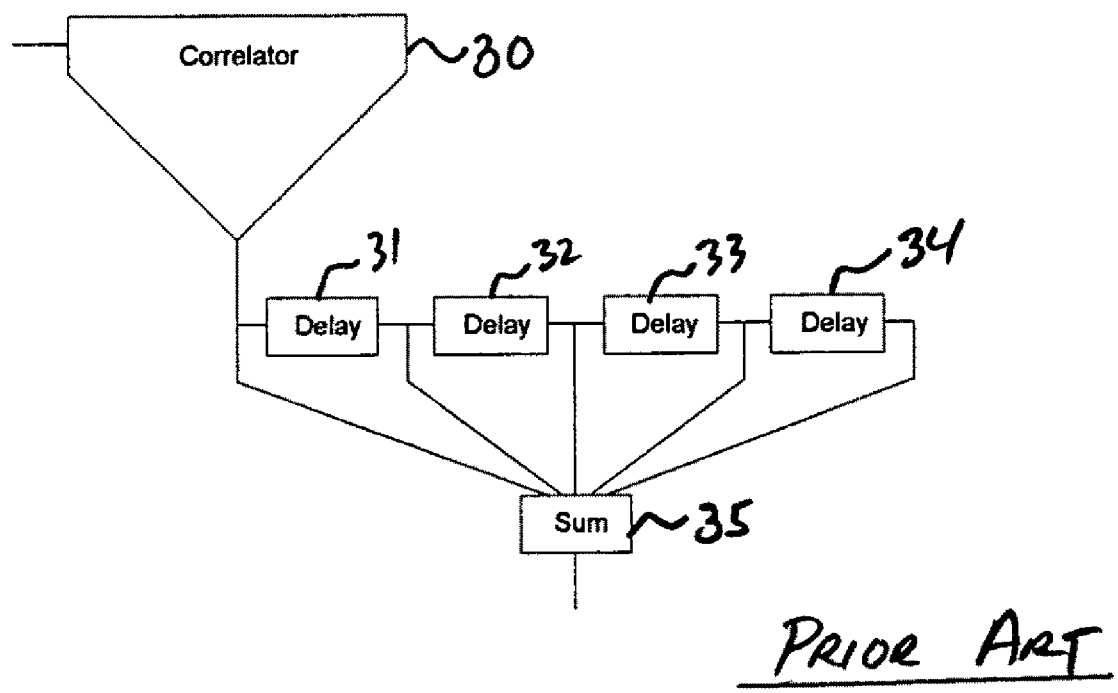
(U) Figure 16

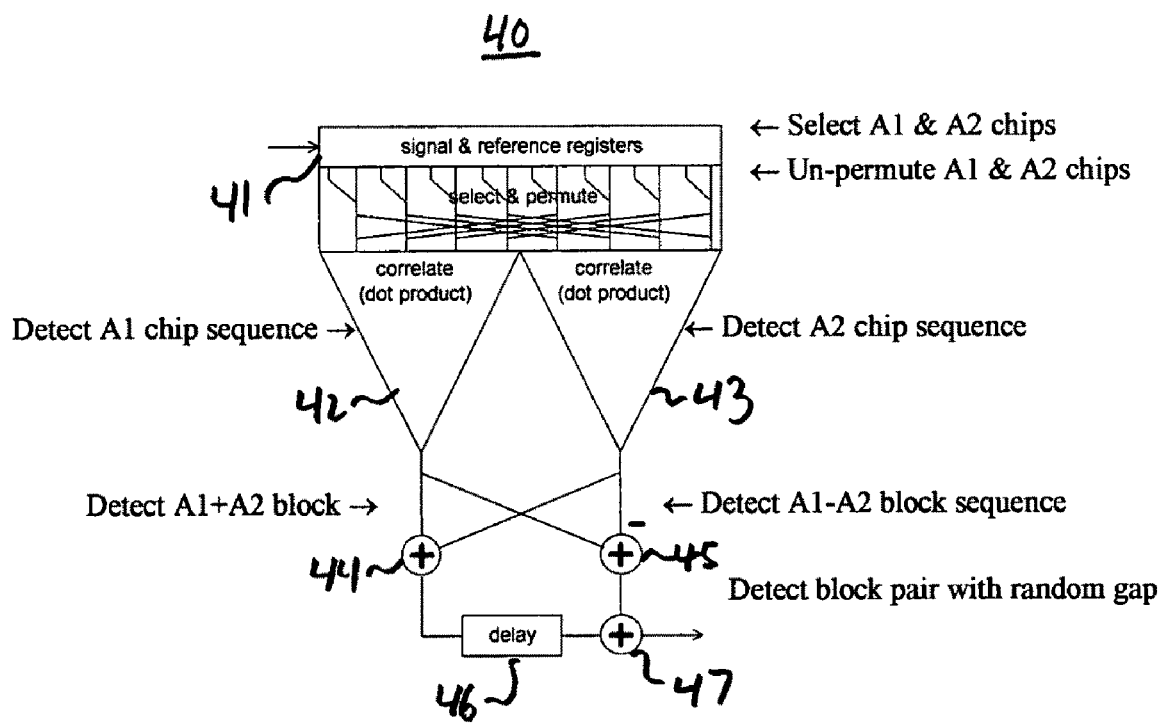
(S) Figure 17

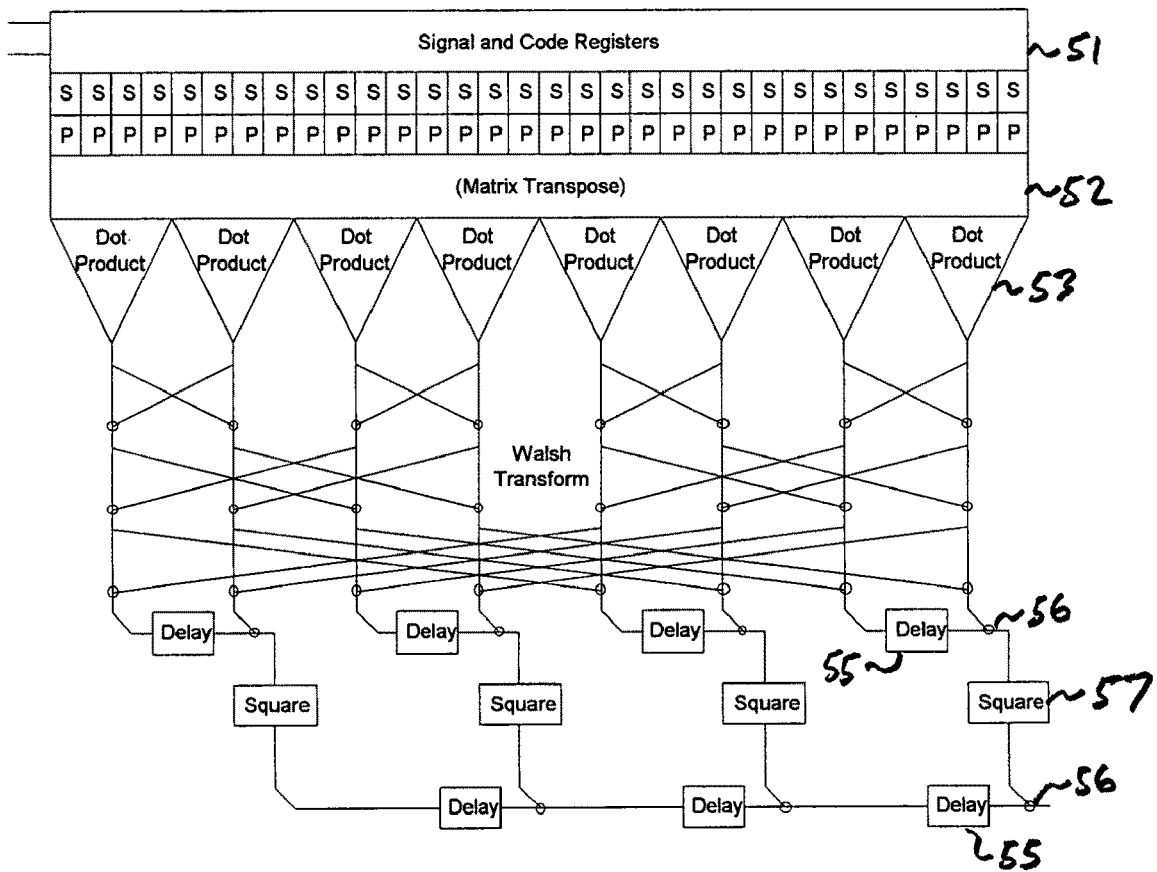
(S) Figure 18

RANGING SIGNAL STRUCTURE WITH HIDDEN ACQUISITION CODE

BACKGROUND OF THE INVENTION

1. Field of the Invention (U) The present invention relates generally to a method or apparatus for creating a data structure for use in either a ranging signal or the synchronization preamble of a digital communications signal. More specifically, the invention relates to an embedded data structure that hides the ranging signal or synchronization preamble from an unauthorized user.

2. Description of the Related Art (U) The Global Positioning System (GPS) system uses ranging signals transmitted by satellites orbiting the earth (launched and operated by the U.S. military) and received by special radio receivers (operated by U.S. military or civilians). This system facilitates accurate determination of the position (map coordinates and altitude) of people, vehicles, and stationary sites anywhere on the earth (where the sky is visible). A Russian system (GLONASS) and a European system in development have generally similar goals and operation. These systems can also be used to determine the position of other satellites.

(U) In general, the transmitted ranging signal has a time-varying structure that is related in a pre-determined way to the transmitter's clock. The receiver generally generates (internally) a duplicate signal (called the reference signal) related in the same manner to its own clock. By comparing the received signal to the reference signal, the receiver can measure the time of arrival (according to its own clock) of any selected portion of the received signal. This comparison is basically done by trying various timings of the reference signal (some earlier, some later) until a reference timing is found that is nearly identical to the timing of the received signal. To reliably detect such a time alignment when the received signal is weak and noisy, the correlation of the received and reference signals is computed. This correlation effectively measures the similarity of the two (tentatively time-aligned) signals over some interval of time. The detection of the received signal and measurement of its time of arrival is more reliable as the correlation interval is made longer.

(U) The measured time of arrival depends on the discrepancy (disagreement) between the transmitter's and the receiver's clocks, and the distance between the transmitter (satellite) and the receiver (user) at the time of the measurement. The measurement is generally interpreted as a pseudorange, that is, the distance plus the clock discrepancy times the speed of light (speed of the radio signal).

(U) Each satellite transmits a different (unique) ranging signal. A receiver can measure the pseudorange to any satellite that is in view by using a duplicate of that satellite's signal as its reference signal. Some receivers (generally those that are stationary) measure the pseudoranges one satellite at a time. Other receivers (generally those that are moving rapidly) measure the pseudoranges concurrently, using more circuitry. In general, the position of the transmitter (satellite) at the time of each pseudorange measurement is known (from orbital data), and the position of the receiver (user) at the time of the pseudorange measurements is unknown.

(U) The mathematics for computing the unknowns (receiver position and clock discrepancy) from the known data and measurements is well documented. Generally four pseudoranges need to be measured, but more pseudorange measurements and/or selecting a favorable set of satellites can improve the accuracy of the results. (Usually six or seven satellites are visible at once.)

(U) Typically, a receiver will initially have only approximate orbital data for the satellites, and its clock may be accurate only to within ten seconds of correct time. This will hinder the ability of the receiver to initially align the timing of its reference signal to the received signal of any of the currently visible satellites. The process of finding the correct timing and thus detecting the received signal is called signal acquisition. After the timing of the first satellite is acquired, the receiver is able to receive a data message (providing more accurate and up-to-date orbital data) that is superimposed on the ranging signal, and can partly correct its clock timing (because the satellite clock accuracy is much better). This makes acquisition of the signals from the remaining satellites easier.

(U) Suppose the ranging signal pattern is a random (but known) sequence of chips (the smallest detail of the signal pattern) at the rate of 10,000,000 chips per second. The received and reference signals must be aligned to within half a chip for the correlation process to detect the received signal, and the possible alignments cover a range of twenty seconds. Thus, there are 400,000,000 possible time alignments to be tried; that is, that many correlations to be computed. If, for example, a correlation interval of one-tenth of a second is needed, and the receiver is equipped with 2,000 correlators, the receiver will be able to try 20,000 alignments per second, taking 20,000 seconds (400,000,000 divided by 20,000), that is, 5.55 hours to try all of the possible alignments. This is clearly not practical. (The satellite may not even by visible that long.) A slower chip rate would allow faster acquisition, but would provide less accurate position measurements.

(U) The design is limited by the fact that the signal is a broadcast signal; that is, there are many receivers for each transmitted signal. Since many receivers must operate simultaneously and independently, including independent starting and stopping of the operation of the receivers, each transmitted signal must continuously provide all of the needed information.

(U) GPS solves this problem by providing two ranging signals for each satellite in a constellation of 24 satellites. First, a Coarse Acquisition (C/A) signal is provided at 1,023,000 chips per second with a known pattern that repeats 1,000 times per second. Secondly, a Precision (P) signal is provided at 10,230,000 chips per second with a known pattern that repeats once a week. The C/A signal can be acquired quickly, providing modest navigational accuracy. The information thus gained allows the P signal to be acquired next, providing more navigational accuracy. Furthermore, a "Navigation" message providing up-to-date orbital data for all satellites is superimposed on one or both ranging signals from each satellite. This data not only helps the receiver to compute its location, but also helps to process the received signals more effectively.

(U) Civilians and the military can both use GPS for peaceful purposes, which are generally navigation (location of moving vehicles) and surveying (location of stationary sites). For such use, protection against improper use, and interference with the proper use, of the system is protected by law and law enforcement, and limited by the cost of such action to a criminal or gang. However, in time of war, international disagreement and military might supercede law and law enforcement, and the resources of a nation generally outweigh those of a criminal or gang. In this context, GPS can potentially be used to guide missiles and military vehicles, and to locate military targets. Thus it is (and has always been) important to the U.S. military to be able to control the signals from the GPS satellites to: 1) restrict the use of these signals by enemy forces (e.g., aiming weapons at us), 2) provide the highest accuracy for the U.S. military (e.g., aiming weapons at them), 3) resist the interference of goal 2 (above) by enemy forces (e.g., jamming and spoofing), and 4) provide modest accuracy for peacetime and civilian use. An enemy jamming signal would try to prevent us from receiving and using the GPS signals. An enemy spoofing signal would try to confuse us by causing us to unknowingly compute wrong data.

(U) GPS has provided signal modes to address the above goals. One mode allows a "Y" signal to be substituted for the P signal. The Y signal is a non-repeating secret pattern known only to U.S. military receivers. This was designed to make a ranging signal useful to U.S. military receivers but not to any other receivers. Other modes degrade the accuracy of the C/A and P(Y) ranging signals, but secret data is made available to U.S. military receivers allowing them to compensate for these signal degradations.

(U) Historically, GPS was made primarily for U.S. military use, but secondarily, it was made available to peacetime civilian use. The above modes were available for use in the event of war. But several developments eventually provided motivation for a change of strategy. The global threat shifted from a 'cold war' standoff to more localized conflicts such as the Gulf War. This motivates more local rather than global control of GPS as a military resource. Worldwide civilian use grew beyond all expectations, creating a competitive global market for GPS technology. This developed an economic threat to U.S. business. GLONASS performance was significantly less than GPS, with questionable support. The European Union (EU) became seriously interested in developing its own alternative 'GPS'. This threatens U.S. military interests and U.S. business interests. Accuracy was soon recognized to be better than expected; and many new techniques have since been developed to further increase the accuracy, including for civilian use. This has been encouraging to the civilians, especially the airline industry (which now recognizes the feasibility of using GPS for aircraft landing guidance), but worrisome to the military.

(S) Additionally (6), one of the manufacturers of civilian GPS receivers has discovered and exploited a flaw in the construction of the Y signal, allowing civilian use of the Y signal without access or use of any secret data.

(U) These developments put the U.S. civilian and military sectors at odds in a political debate. If the military continue to protect their interests only by globally degrading the civilian quality of GPS, then eventually, the EU would satisfy the civilian needs with their system. This would be bad news to both U.S. business and the U.S. military. The U.S. economy would lose business to other countries, and U.S. military control would be diluted.

(U) This situation can be resolved by the following strategy. Give the civilian sector global access to the C/A and P ranging signals with a guaranteed level of accuracy (no degradation of quality). However, in war zones, the U.S. military can locally suppress the C/A and/or P signals. For example, the C/A signal can be jammed, and this would suppress acquisition of the P signal. For use in war by the U.S. military, provide a new Military Access (MA) ranging signal. This signal needs to have the following attributes: It should be usable only by the U.S. military. (Secret data is needed to understand the signal.) It should be resistant to jamming and to spoofing.

(U) However, a signal pattern with sufficient detail to provide high precision inherently cannot be acquired quickly (as explained above). This is especially problematic for military applications because of the presence of jamming and the needs of high precision and fast acquisition. This situation suggests the use of separate military ranging signals for acquisition and tracking, analogous to the C/A and P ranging signals available for civilian use.

(U) One design method for the new Military Access (MA) signal is to use an unstructured (perfectly random) sequence of bits (also called chips) at a high rate (typically 10 MHz), using a cryptographic algorithm to generate the sequence deterministically and synchronized to clock time. That is, any receiver that has the cryptographic algorithm, the secret key used to control the cryptographic algorithm, and correct clock timing, can generate the same random sequence generated by the transmitter. (As explained earlier, by generating a reference signal, a receiver can search for and detect a similar received signal.) If the receiver's clock timing is in error, which is usually the case, this error will simply add to the uncertainty of the transit time of the signal from the transmitter to the receiver. This type of signal has the attributes of being usable by the U.S. Military, and of being resistant to jamming and spoofing. It also works very well for the tracking mode of the receiver, but it works poorly for acquisition.

(C) It has been proposed that a structured signal should be embedded within the unstructured signal described above. (Embedded means that selected bits of the unstructured signal are replaced with bits that comprise the structured signal. A few authors call the embedding "puncturing", but in the general literature of signal coding, puncturing refers to removal of code elements, not replacement.) The basic idea is that the embedded structured signal would be designed to aid acquisition while not interfering with tracking. An embedded signal avoids much of the costs of a separate acquisition signal. It also needs to have the attributes of being usable by the U.S. Military, and of being resistant to jamming and spoofing. As implemented by the present invention, the embedded signal would also be 'invisible' (completely undetectable) by receivers that lack the secret data used in its construction.

(C) It is generally recognized that in order to obtain the required attributes, the embedded signal will need to have randomized parameters. That is, the code construction will use random values generated by the cryptographic algorithm, which is controlled by clock time and by secret data. Thus, only receivers that have the cryptographic algorithm and the secret data (U.S. military receivers) will be able to determine the values of these parameters for any given time of the day. Because the values are random, other observers will not be able to learn from previous values how to guess future values.

(S) A number of embedded signal structures have been proposed. One type called GRASP or GRASP-lite, embeds multiple copies of a block of random bits in random positions (at random times). Another type called CCAS1, constructs larger blocks from smaller blocks by randomly varying the polarities of the copies of the smaller blocks. The larger blocks are repeated, and the time positions of the small and large blocks are randomly varied. (Random bits, random times, and random polarities are examples of randomized parameters.)

(U) In addition to the GPS signal structures discussed above, there are other signaling and messaging applications where the present invention can be used. It is common in digital communications to prefix to each message a synchronization pattern. The purpose of this pattern is to help the receiver to lock onto the bit rate and phase, and to determine reliably the precise start of the message content. That is, such a pattern is also an "acquisition aid". The requirement to detect the precise time of arrival reliably is similar to the requirement for ranging signals. In a military environment, these synchronization preambles also need to be resistant to jamming and to spoofing.

(S) The proposed signal structures briefly described above fail to adequately provide the attributes of being usable by the U.S. Military, and of being resistant to jamming and spoofing. Mainly, resistance to spoofing and jamming is inadequate. An enemy receiver designed to search for repeated data can detect the repetition of data blocks. When a first repeat is detected, then the data that is repeated is also detected, and this can be used to detect subsequent repetitions of the same data. A jammer that is guided by such a receiver can expend its available power on jamming most of the repeated blocks, rather than jamming all of the signal. That is, when the onset of a repeat block is detected, the jammer is switched on to jam the remainder of the block. Jamming the part of the signal most needed for acquisition gives the enemy the advantage of doing more damage for a given amount of power, or, requiring less power to inflict sufficient damage, or, extending the effective range of the jammer. Enemy detection of repeat blocks can also be used for spoofing, by mimicking critical portions of the signal. The enemy's cost for detection of repeat blocks is estimated to be of the same order of magnitude as the detection cost of an authorized (U.S. military) receiver.

(S) This weakness with regard to enemy detection can be minimized by reducing the number of repetitions or by reducing the size of the repeated blocks. But these reductions also weaken the ability to aid acquisition by authorized receivers. This need to trade off the ease of enemy detection vs. the ease of authorized detection limits the choice of signal parameters.

(S) There is a need for flexibility in the design of military receivers, because some military applications require faster acquisition than others, some need more jamming resistance (operate closer to the enemy), some move faster and have greater velocity uncertainty, etc. Since the receivers designed for these applications must all use the same signals from the same constellation of satellites, the design of the signals transmitted by the satellites must suffice for the diverse needs of all of the receivers. This need for flexibility is restrained by the above limitation of signal parameter choices.

(S) Additionally, for one of the proposed signals, the definition of the signal timing allows enemy receivers to obtain useful ranging information from the signal without access to secret data. This signal thus fails to provide the attribute that the signal be usable by only the U.S. military.

SUMMARY OF THE INVENTION (U) The present invention is applicable to both GPS signal structures and to synchronization preambles. These patterns are generally repetitive and predictable (by both authorized and unauthorized receivers), and thus are prone to spoofing and other attacks in a military context. An encrypted message may follow the synchronization preamble, but generally no secret information is needed to detect the preamble. Thus an enemy receiver can detect the preamble just as easily as the authorized receiver can. In a military environment, it is often desirable that signals are not detectable by the enemy; but the repetitive and predictable character of the preamble typically makes this part of the signal the most easily detected.

(S) A signal constructed according to the present invention adequately provides the attributes of being usable by the U.S. Military, and of being resistant to jamming and spoofing. Blocks of data are not simply repeated. Data is repeated, but permutation, dispersal and orthogonal patterns obscure the repetitions. The permutation and dispersal patterns and the data timing are varied randomly so that the enemy cannot anticipate these. The number of parameter combinations that an enemy receiver must guess in order to be able to detect the signal structure is so large that the enemy's cost of detection is many orders of magnitude greater than that of a typical signal detector (parallel correlator). It is so large that we can safely conclude that it is unaffordable and impractical. That is, we can choose signal parameters that make the enemy's cost of detection impractical while our cost of detection is practical. The embedded signal can be made so hard to detect (without secret knowledge) that the enemy is not likely to find that an embedded signal exists.

(S) Because the signal structure is safe against enemy detection, the amount of data repetition and the size of the data blocks are not limited by this security concern. It is thus safe for the satellites to transmit many large data blocks, to provide sufficient acquisition aid to the authorized receivers that need the most aid. The cost of receivers that require less aid can be reduced, because these receivers can be designed to detect only some of the available data blocks (fewer blocks or smaller portions of the blocks). Thus, the present invention provides greater flexibility to design different receivers for different military applications, all using the same satellite signals.

(S) The present invention can also be applied to the design of synchronization preambles, making them hard to detect by enemy receivers, while providing robust time-of-arrival detection for authorized receivers. A synchronization preamble based on the present invention can also be adapted to provide preliminary information such as message type.

BRIEF DESCRIPTION OF THE DRAWINGS (S) FIG. 1 is a diagram of a simple orthogonal pair of blocks of data.

(S) FIG. 2 is a diagram of a permuted orthogonal pair of blocks of data.

(S) FIG. 3 is a diagram of a permuted and dispersed orthogonal pair of blocks.

(S) FIG. 4 is a chart of a combinatorial analysis of a pair of blocks.

(S) FIG. 5 is a diagram of Hadamard matrices of sizes two, four and eight.

(S) FIG. 6 is a table of binary notation of decimal integers 0 through 7.

(S) FIG. 7 is a table of alternative expressions.

(S) FIGS. 8 and 9 are tables of a two block construction and a four block construction, respectively.

(S) FIG. 10 is a table of an eight block construction.

(S) FIG. 11 is an example of random permutation data flow.

(S) FIGS. 12a-12d are illustrations of a four step signal construction.

(S) FIG. 13 is a top-level block diagram of the hardware used for signal generation.

(S) FIG. 14 is a block diagram of the acquisition code generation of FIG. 13.

(S) FIG. 15 is a block diagram of a prior art parallel correlator.

(S) FIG. 16 is a block diagram of a prior art extended correlator.

(S) FIG. 17 is a block diagram of a modified extended correlator used for two block signal detection.

(S) FIG. 18 is a block diagram of a modified parallel correlator used for eight block signal detection.

DETAILED DESCRIPTION OF THE INVENTION (U) A primary objective of the present invention is the structure of the ranging signal to be transmitted by each satellite of the system, and to be received and detected by each of the authorized receivers. A secondary objective of present invention is how to generate such a signal structure, and how to detect such a signal structure. Signal generation circuits are needed in the transmitters (satellites) and in the receivers for generation of a reference signal for the tracking mode. Signal detection circuits are needed in the receivers for the acquisition mode. The present invention assumes the use of a cryptographic data source for time-dependent random data, but does not specify the methods of the cryptographic data source. It is only assumed that the cryptographic data source can be adapted to provide the random data at the rate needed.

(S) The basic problem, from an intuitive viewpoint, seems to be that data must be repeated in order to provide an advantage to aid acquisition; but simple repetition is easily detected by an enemy receiver, and can be exploited to aid jamming and/or spoofing attacks. Randomizing the timing and polarity of the repeated blocks is not sufficient to prevent enemy detection. It is not too costly for the enemy to search for a pair of blocks that are similar. However, we want to use the same data to construct two or more blocks so that it will be economical for an authorized receiver to use one detector to detect any or all of these data blocks.

(S) We can begin to solve this problem if we can construct two blocks such that they look different (unrelated) to an enemy receiver, but such that an authorized receiver can detect either block with one detector. This implies that the authorized receiver must use secret data that is unavailable to the enemy receiver. To make it easier to understand our invention, we will first show how this problem is solved for two blocks, then show how the concept can be extended to any pair of many blocks, and to triplets (or more) of blocks out of the full set of transmitted blocks.

(S) Consider the process of comparing two blocks for two cases. The first case is when one block is a random sequence, and the second block is a simple repeat of the first. The second case is when the two blocks are different, and unrelated random sequences of the same length.

(S) The comparison process examines pairs of bits: the first bits of the blocks, the second bits of the blocks, the third bits of the blocks, etc. In the first case, the pair-values 0,0 and 1,1 will be found, but not the pair-values 0,1 and 1,0. Or, if the second block was repeated with inversion (changing every bit to the opposite value), then the pair-values 0,1 and 1,0 will be found, but not the pair-values 0,0 and 1,1. But in the second case, all four pair-values will be found; on average, equal numbers of the four pair-values will be found. We want to construct our pair of blocks such that the comparison process will obtain results similar to that for a pair of unrelated random blocks. We will begin with a simple construction that partly solves the problem, and add features until the problem is fully solved.

(S) Suppose that we construct each block of two smaller component blocks as shown in FIG. 1. All of the bits of the first block are repeated in the second block, but the first half of the bits (component A0) are repeated without inversion, and the second half of the bits (component A1) are repeated with inversion. A comparison of these two blocks will find, on average, equal numbers of the four pair-values, like the case of a pair of unrelated random blocks. When comparison of two blocks obtains this result, we call the pair of blocks orthogonal.

(S) One detector, consisting of two component correlators, can detect both blocks of FIG. 1, as follows. One correlator uses component A0 as a reference code, and the other correlator uses A1. If the outputs of the two correlators have the same polarity, then the receiver will know that the first block is detected; and if the correlator outputs have opposite polarity, then the receiver will know that the second block is detected. Thus, the sum of the correlator outputs provides an indicator of the first block, and the difference of the correlator outputs provides an indicator of the second block.

(S) However, the enemy might not compare the two blocks in their entirety. The enemy might compare the first halves (components) of the blocks, or compare the second halves (components) of the blocks. These are simple repetitions, and are easily detected as explained earlier.

(S) To fix this weakness, we randomly permute each block before it is transmitted as depicted in FIG. 2. The permutation will be chosen by random, secret, and time-varying bits generated by the cryptographic algorithm, so that only authorized receivers will know it. The same permutation will be used for both blocks, because the receiver needs to undo the permutation before entering the received data into its two correlators, before it is known whether the block is the first one or the second. The authorized receiver, by knowing the secret permutation, is able to divide the received data into the two components, so that each component can be correlated separately. However, the enemy receiver, not knowing the secret permutation, is unable to compare the first and second components separately. His best effort is to compare the two blocks in their entirety.

(S) It is necessary for the permutation only to mix the two components (A0 and A1) of each block, not to mix bits within either component. Each component is already completely random, and mixing the bits within either component cannot make the data any more random. Thus it is sufficient that the permutation randomly swaps pairs of bits: the first bits of the halves, the second bits of the halves, the third bits of the halves, etc. A random swap of a pair of bits means that with equal probability, the two bits either exchange positions or are left unchanged.

(S) Although the random permutation has made the data structure more secure, there remains another weakness that we must fix. The counts of the number of {0,0}, {0,1}, {1,0}, and {1,1} pair-values are not quite as random as in the case of two unrelated blocks. The sum of the counts for pair-values {0,0} and {1,1} are always the same as the sum of the counts for pair-values {0,1} and {1,0}. The enemy will be able to detect the pair of blocks by comparing these two counts. Furthermore, once the pair of blocks is detected, the enemy can use the locations of the {0,0} and {1,1} pairs to determine the locations of the A0 bits, and can use the locations of the {0,1} and {1,0} pairs to determine the locations of the A1 bits. Thus, the enemy can effectively determine the secret permutation.

(S) To fix this weakness, we add the components B0 and B1 to the data structure, as shown in FIG. 3. These components each have 2N random bits, and the random choices of these bits are independent of one another and of all other random choices. Since component B1 is not a repetition of component B0, these components do not help as an acquisition aid. Thus, the authorized receiver (in the acquisition mode) will ignore these bits, which are used only in the tracking mode. The bits that the authorized receiver uses for acquisition (The A0 and A1 components) are randomly dispersed among the B0 and B1 components. The enemy receiver, not knowing the secret permutation, is unable to select the bits of the A0 and A1 components, and thus cannot compare the sum of the counts for pair-values {0,0} and {1,1} to the sum of the counts for pair-values {0,1} and {1,0} as described above. His best effort is to compare the two blocks in their entirety.

(S) As noted above, the random permutation does not need to mix the bits within any of the components, each of which is already completely random. It suffices to mix the bits between the A0 and A1 components, and to mix the bits between the A0/A1 components and the B0/B1 components, using random swaps.

(S) The construction of a permuted and dispersed orthogonal pair of blocks is illustrated in the chart of FIG. 4 for the length N=8 under the title Block Definition, and the comparison process for this pair of blocks is illustrated in the same chart under the title Combinatorial Analysis. Each row of the Combinatorial Analysis section corresponds to the same row of the Block Definition section. For example, row 2 compares the A1 component of block A to the −A1 component of block B. The {1,0} pair-value listed in the A,B columns refers to the occurrences of a one in bit n of the A1 component of block A and a zero in bit n of the −A1 component of block B, for bit positions n=1 to N. For the example data of:

A1=10101000
−A1=01010111 the {1,0} pair-value occurs in bit positions 1, 3, and 5—three times (R2=3), which is one less than the average. The pair-values {0,0} and {1,1} are not listed in row 2 because these never occur here (we are ignoring reception errors). Likewise, the pair-values {0,1} and {1,0} are not listed in row 1.

(S) The number of {1,1} pair-values is a random count named R1. Since the sum of the counts for pair-values {0,0} and {1,1} is always N, the number of {0,0} pair-values is not an independent count, but will always be N−R1, as listed in the chart. Likewise, the number of {1,0} pair-values is an independently random count named R2, and the number of {0,1} pair-values is the dependent count N−R2 as listed. Also, we can choose to name R3, R4, and R5 as independent counts, but the number of {0,0} pair-values then depends on these counts by the formula 2N−R3−R4−R5. Row 4 of the chart accounts for the four pair-values that an enemy receiver can observe when comparing blocks A and B. An enemy receiver can observe the independent counts C1, C2, and C3. The count labeled 3N−R1−R3−R4−R5 in the chart is dependent because it is equal to 4N−C1−C2−C3.

(S) An enemy receiver cannot determine the counts R1, R2, R3, R4, or R5 because it does not know the secret permutation. In fact, the counts C1, C2, and C3 entirely describe all that the enemy receiver can observe about the blocks A and B. A mathematical analysis of the probability distribution of the counts C1, C2, and C3 shows that for large values of N, this probability distribution (for two secretly structured blocks) is very close to the probability distribution for two completely random (unstructured) blocks of the same size. Theoretically, an optimal detector for an enemy receiver can be designed using the probability distribution of the counts C1, C2, and C3. The mathematical analysis indicates that an optimal detector using the counts C1, C2, and C3 (all that the enemy receiver can observe) is very prone to false detection. That is, the enemy's best detector will indicate a find when nothing is actually found much more often than it will indicate a find when the block pair is actually found. (Such a detector is practically useless.) Since the structured blocks are embedded in random positions within a completely random (unstructured) sequence of bits, the enemy is unable to discern the structured blocks against the unstructured background. That is, the acquisition code blends into its background like a camouflaged animal blends into its background.

(S) So far, we have shown that we can construct a pair of blocks such that they look unrelated to an enemy receiver, but such that an authorized receiver can detect either block with one detector. Next, we will show how the concept can be extended to any pair of many blocks. The extended concept will also apply to triplets (or more) of blocks out of the full set of transmitted blocks.

(S) The extension can be accomplished by using polarity patterns called Hadamard matrices. The principles of Hadamard matrices explained below are known mathematical theory. Hadamard matrices of sizes 2, 4, and 8 (the number of rows and columns) are illustrated in FIG. 5. The matrix size can also be specified by the number of dimensions: for n dimensions, the corresponding matrix has $2^n$ rows and $2^n$ columns.

(S) We will explain the construction of these Hadamard matrices in terms of the binary notation of integers, illustrated in FIG. 6 for three-bit integers. In FIG. 6, notice that the polarity patterns listed are simply a transformation of the binary integers: each zero digit is changed to a plus symbol and each one digit is changed to a minus symbol. We have labeled the binary digit positions by their weights (4, 2, and 1 from left to right). The decimal value of any binary integer can be computed by summing the weights of the binary digits that are ones. For example, 101 converts to 5 because the weight of the leftmost 1 is 4 and the weight of the rightmost 1 is 1; the sum of these weights is 5.

(S) The size-8 Hadamard matrix of FIG. 5 can be constructed from the table of FIG. 6. First, we can create columns 1, 2, and 4 of the Hadamard matrix by copying the columns of the polarity patterns in the table that are labeled 1, 2, and 4. We will call these the basis columns. (Mathematically, these are called basis vectors.) Notice that 1, 2, and 4 are the binary weights. Notice also that the binary integers corresponding to the decimal values 1, 2, and 4 each have exactly one digit that is a 1, and that the polarity pattern in each case has exactly one minus.

(S) The zero column will always have only plus symbols. To construct the remaining columns of the Hadamard matrix of FIG. 5, we need a special form of addition, defined in FIG. 7 with three alternative forms of notation. The addition shown in the leftmost table is called modulo-two addition (or an exclusive-or operation in Boolean logic). We will use the equivalent operation with polarity (plus and minus) symbols shown in the center. The 'addition' rule can be remembered easily if we mentally add a one after each polarity symbol as shown in the table at the right of FIG. 7, in which case we follow the familiar rule for multiplication. The remaining columns of the Hadamard matrix of FIG. 5 are constructed by 'adding' the basis columns as explained next. The numbers of the remaining columns are sums of the numbers of the basis columns, as follows:

3=1+2

5=1+4

6=2+4

7=1+2+4.

(S) Thus, column 3 of the size 8 Hadamard matrix of FIG. 5 is constructed by adding columns 1 and 2; and column 7 is constructed by adding columns 1, 2, and 4. To add two columns, the symbols in each row are added using the above addition rule. This is illustrated in the above Hadamard matrices. The same principles are used to construct Hadamard matrices of any size that is a power of two.

(S) When we constructed a pair of blocks, the components were two random sequences of N bits each, named A0 and A1, and two random sequences of 2N bits each, named B0 and B1. We also chose a random permutation P for permuting these components. The first block permuted components A0, A1, and B0 with permutation P, as shown in the first column of the next table. The second block permuted components A0, −A1, and B1 with permutation P, as shown in the second column. The polarities in the shaded part of this table are the polarities of the size-2 Hadamard matrix. Thus, we were using a Hadamard matrix, even though we didn't say so in the earlier description.

(S) To construct a set of four blocks, we begin with four random sequences of N bits each, named A0, A1, A2, and A3, and four random sequences of 4N bits each, named B0, B1, B2, and B3. We also choose a random permutation P for permuting these components. Each block permutes the components listed in the table of FIG. 9 with permutation P. Notice that each block uses all of the 'A' components, and uses a different one of the 'B' components, and the polarities are taken from the Hadamard matrix of the appropriate size.

(S) The construction for eight blocks, shown in the table of FIG. 10, is similar, but we use eight random sequences of N bits each, and eight random sequences of 8N bits each, and the permutation and Hadamard matrix are larger. This construction method can be extended to larger sizes.

(S) Block Pairs—If we compare any two columns of a Hadamard matrix, we will always find that the four possible combinations of polarities occur equally. The block pairs that use these two columns inherit this property. For example, compare blocks 5 and 6 in the table of FIG. 10, which uses columns 5 and 6 of the size-8 Hadamard matrix. The polarity combination ++ occurs in rows 0 and 7 (twice). The polarity combination −+ occurs in rows 1 and 6 (twice). The polarity combination +− occurs in rows 2 and 5 (twice). The polarity combination −− occurs in rows 3 and 4 (twice). The uniform number of polarity combinations makes the blocks of this pair appear to be unrelated to a receiver that does not know the secret permutation, that is, to an enemy receiver.

(S) In summary, an enemy receiver cannot detect single blocks (guessing the position of one block at a time) because they are just random bit sequences, and look like any other part of the signal. When simple block repetition is used, the enemy can detect block pairs. The enemy receiver must guess the positions of two blocks at once to do this, but the cost of doing so is not very different from the cost of the authorized detector. Now, the use of a Hadamard matrix in the block structure prevents the enemy from detecting block pairs. This raises the question: what if the enemy tries to detect block triplets?

(S) Block Triplets—Block triplet detection means that the enemy receiver will guess the positions of three blocks at once, and for each three-part guess, will compare a set of three blocks. We can easily randomize the block timing so that there are at least 1000 equally possible positions for each block; this means that the cost of the enemy detector will increase by about 1000 for each additional simultaneous guess that the enemy receiver will need to handle. So preventing block pair detection increases the cost of attack by at least 1000-fold. (This is like changing from a combination lock with two numbers to one with three numbers.)

(S) A set of three blocks will be practically undetectable if, when we compare the three columns of the Hadamard matrix from which these blocks were constructed, the eight possible combinations of polarities occur equally. (Mathematically, the three vectors are orthogonal in three dimensions.) When Hadamard matrices larger than the examples given here are used, this condition will be true most of the time; that is, the triplet detector will fail most of the time. However, it is possible to arrange the block sequence such that this condition is true for all triplets of consecutive blocks. We can also choose a set of half of the blocks such that this condition is true for all triplets of blocks. We can send only this half of the blocks, or can send this half first. These strategies increase the cost of attack by at least another 1000-fold; that is, the enemy's detection cost will be (at least) about 1000,000 times our detection cost.

(S) Gray Code Sequences—Without going into the mathematics of Gray code sequences, we will simply state here the observation that if all of the blocks except block 0 are transmitted in a Gray code sequence, the above condition will be true for all triplets of consecutive blocks. If we send only the middle half (the second and third quarters) of a Gray code sequence, the above condition will be true for all triplets. If we want to send all of the blocks, an optimum sequence would be: first the middle half of the Gray code sequence, then the remaining blocks, with block 0 being last.

(S) Block Quadruplets—Theoretically, the enemy may design a receiver that guesses the positions of four blocks at once, because triplet detection is ineffectual. This might become practical in the future if there is a technological breakthrough that greatly reduces the cost of correlation or similar processing. Thus, we have examined how often a set of four columns of a Hadamard matrix will have a uniform number of the 16 possible combinations of four polarities. We found that this condition is true most of the time, especially for larger matrices. Thus, our estimate of the cost of attack is increased by yet another 1000-fold; that is, the enemy's detection cost will be (at least) about 1000,000,000 times our detection cost. In short, unauthorized detection of this type of signal structure is impractical if the block timing is properly randomized.

(S) An "Anti-Spoof Without Error Extension" (AnSWEr) algorithm, disclosed in U.S. Pat. No. 5,734,721, which is herein incorporated by reference, by the same inventor, economically implements the random permutations required for the signal structure described here. A typical permutation is illustrated in FIG. 11 for the case of permuting 8 bits (one bit each of 8 repeated components) and dispersing these with 8 non-repeated bits. Each X in the FIG. 11 represents the left-to-right data flow of a random swap. For each random swap, a random bit chooses whether a pair of bits is swapped (crisscross flow) or remains in the same positions (parallel flow). More specifically, in FIG. 11 the input is from the left side. The 8 non-repeated bits (top) do not need to be permuted, because they are completely random. The 8 bits at the bottom need to be permuted to hide the associated polarity pattern. This is done by three layers of random swaps (left to right). The output is on the right side. The last layer of random swaps mixes the top and bottom halves. This mixes the perfectly orthogonal, but too obviously structured pattern of the bottom bits with the perfectly random bits at the top, thus camouflaging the structure.

(S) In the above sections, we have described each of the basic features of the signal structure. Here, we show how these features fit together by showing a four-step construction, using the visual aid of the diagrams herein. In these diagrams, each bit is visually represented as a small cube, and the whole structure as a brick-like stack of these cubes. To make the example easier to follow, we have chosen small numbers: we construct a set of eight blocks, using 32-bit random sequences as components.

(S) FIG. 12a gives the basic dimensions of the 'brick' for this example: 8 bits high, 32 bits wide, and 8 bits deep. We begin by choosing 256 random bits (the cryptographic algorithm does this for us). We place these 256 random bits in the front-left face (layer) of the brick. Each row of 32 bits is one of the component blocks (A0, A1, ... A7 from top to bottom).

Then we copy this front layer to each of the layers behind it, thus repeating these bits. At this point, we have simple repetition, but we have only started. (These layers correspond to the blocks that will be transmitted.)

(S) FIG. 12b shows the next step: applying the Hadamard matrix. The front-right face of the 'brick' is an 8-by-8 square, and we preferably copy an 8-by-8 Hadamard matrix onto this face. For each minus symbol of the Hadamard matrix, we change the polarity of the bit in that position, that is, we change a 1 to a 0, or a 0 to a 1. These polarity changes are repeated through the interior of the brick in the labeled "repeat polarities".

(S) FIG. 12c shows how the permutation process is applied. Up to this point, the 'brick' has represented only the repeated bits. Here, we append (below) a brick of equal size and shape that represents the non-repeated bits. The diagram does not show the individual cubes (bits) of the bottom 'brick' to emphasize that there is no structure here: every bit is an independently random choice.

(S) Every vertical column of the front-left face (layer) of the brick is separately permuted. Since there are 32 columns across this face, we have 32 different permutations, each composed of random swaps. (The cryptographic algorithm provides all random choices.) The permutation of each column of bits has two parts as illustrated earlier: the first part permutes the repeated bits in the top half of the column, and the second part mixes the top and bottom halves, randomly dispersing the structure of the top half. The 32 random permutations of the front-left face are repeated on the layers behind (left to right) as indicated.

(S) FIG. 12d shows the sequence and timing of the bits (also called chips) as they are transmitted. Gaps are shown between the layers that represent blocks to show that there are random gaps between these blocks, filled in by purely random bits (not shown). The front-left face is the first block transmitted, and the other blocks follow in the 'depth' direction, left to right. For each block, the back-left column is sent first, and the remaining columns follow from back-left to front-right. For each column, the bits are sent from top to bottom. However, if we choose to optimize the block sequence, we will not send the blocks in the normal order 0, 1, 2, 3 . . . shown here, but in a modified Gray-code sequence as discussed earlier.

(S) It may be desirable in certain situations to use a fixed permutation in addition to a random permutation. Notice that the random permutations (using the AnSWEr algorithm) are applied immediately after the application of the orthogonal polarity patterns (using a Hadamard matrix). It happens that the structure of the AnSWEr algorithm and the structure of the Hadamard matrix both involve the same orthogonal partitioning of the vertical range of the code structure (that is, what is shown vertically in the above diagrams). The orthogonal partitioning pattern consists of partitioning the entire range in half; and recursively partitioning each half into halves until no further partitioning is possible. For a range of $2^n$ chips, n recursive levels of partitioning are used. These levels can be labeled 1, 2, 4, 8, etc. according to the size of the halves (which is also the distance between a half and its mate) on a given level.

(S) As a result of this common structure (the partitioning pattern), the random permutations and the orthogonal polarity patterns do not operate as independently as might at first be supposed. Instead, level 1 of the permutation algorithm randomizes only level 1 of the polarity pattern, level 2 of the permutation algorithm randomizes only level 2 of the polarity pattern, etc., without affecting the other levels.

(S) What we expect (and prefer) is that each level of the permutation algorithm should randomize all levels of the polarity pattern. This provides greater security, because the levels cannot be attacked one at a time, but must be dealt with all at once. To obtain this kind of independence of the permutation and polarity patterns, a fixed permutation can be inserted between of the permutation and polarity operations. A fixed permutation will cost essentially nothing, because a hardware design requires only a wiring pattern to implement a fixed permutation. There are permutations with mathematical properties that provide this independence.

(S) In the GPS (or similar) application, the context of the acquisition code generation may be as shown in FIG. 13. In other applications, such as message synchronization, the context may differ somewhat. It is assumed that a cryptographic algorithm is used to provide a random data source 10 as shown. Some of the random data will be used by a block timing generator 11 to randomize the timing of the acquisition code blocks. Other of the random data will be used to provide a random bit sequence called the default code in the diagram. The default code is the random bit sequence that is transmitted whenever acquisition code blocks are not transmitted. That is, the default code is the 'background' against which the acquisition code blocks is 'camouflaged'. The block timing generator 11 thus controls a code multiplexer 12 to switch between sending the default code and the acquisition code.

(S) The acquisition code generator 13 needs some of the random data (R) to randomly vary the acquisition code (A), and needs block timing information (B) from the block timing generator 11. It also needs some of the default code bits (D) to disperse within the code blocks. The acquisition code generator 13 is detailed further in FIG. 14.

(S) Referring now to FIG. 14, we use the same example sizes as were used in FIG. 12 earlier. The circuit shown here operates in 32 cycles to create a 256-chip block dispersed over 512 chips. Each cycle processes one column of FIG. 12. The code multiplexer 12 of FIG. 13 is also included in FIG. 14 as the mux (multiplexer) 12 at the upper right. The interfaces of the acquisition code generator 13 with the rest of the system designated by D, R, B, and A in FIG. 13 appear here in FIG. 14 as:

D (Default code): random bits entering the shift register 14 at the upper left, and proceeding from there to the mux 12 at the upper right.

R: Random bits entering the memory fill control 15 at the lower left.

B (Block control): column number (5 bits) and block number (3 bits) entering at the bottom, and block enable at the upper right. Other clocks and timing signals are not shown here.

A: Acquisition code leaving the shift register 16 at the far right and entering the mux 12 at the upper right.

(S) We assume here that the stream of random bits entering at the lower left flow at the same rate as the bits leaving at the upper right. When an acquisition block is not enabled, all of these bits flow through the shift register 14 at the upper left, which provides a fixed delay in this case. When an acquisition block is enabled, half of these bits enter the shift register 14 at the upper left, and as much of the remaining bits as are needed enter the memory fill control 15 at the lower left. The memory fill control 15 fills one bank of a code memory 17 and one bank of a permutation memory 18 with data to be used for the next acquisition block while the other banks are used to provide data for the current acquisition block. For each of these memories, the banks are switched, reversing roles, after each block is processed. Each bank of the code memory 17 holds the 256 random bits that are repeated for 8 blocks as shown in FIG. 12a. Each bank of the permutation memory 18 holds 640 random permutation control bits that specify the random permutations that are repeated for 8 blocks as shown in FIG. 12c. The data in each bank are arranged in 32 words that correspond to the 32 columns per block of FIG. 12c, and which are used in 32 processing cycles here. For each memory, the 5-bit column number specifies the word to be read for the current cycle (column).

(S) When an acquisition block is enabled, the acquisition block is generated in 32 processing cycles, one cycle for each column of the block. For each processing cycle, data flows generally from left to right in the figure, and is processed as follows. Eight of the random bits are shifted into the shift register 14 at the upper left, and another eight of the random bits are entered to the memory fill control 15 at the lower left if needed. An 8-bit word is read from the code memory 17, and the polarities of these 8 bits are changed by the polarity logic shown in the FIG. 14. These polarity changes correspond to those specified by the Hadamard matrix. Any one polarity change depends on the bit position (matrix row) and (matrix column). Each ⊕ symbol of the polarity logic indicates an exclusive-or gate. Each gate reverses the polarity of a bit from the code memory 17 whenever the block number bit is a one. The next processing is the permutation logic, which has five layers from left to right. The first layer is a fixed permutation, done by a fixed wiring pattern, which changes the order of the bits as shown. The remaining layers provide a random permutation. Each X in the figure represents the left-to-right data flow of a random swap. For each random swap, a random permutation control bit chooses whether a pair of bits is swapped (crisscross flow) or remains in the same positions (parallel flow). To avoid cluttering the figure, the control bits are not shown explicitly connected to the swaps, but are shown below the permutation logic. Three of the swap layers use four control bits each, and the last layer uses eight control bits, for a total of 20 permutation control bits. Most of the permutation layers permute the repeated bits from the code memory, but the last permutation layer disperses the repeated bits (bottom) among the non-repeated bits (top). The resulting 16 bits are loaded into the shift register 16 at the far right, and are shifted out through the mux 12 at the upper right while 16 random bits are entered from the left.

(S) Notice that the column number selects the code bits and the permutations, but the block number changes the polarities. FIG. 14 also suggests what the acquisition receiver must do to reverse this processing. The receiver must do each permutation in reverse (right to left) to unscramble the data. The receiver's first permutation layer (which corresponds to the transmitter's last layer) will separate the repeated bits (which the receiver uses to detect the code) from the non-repeated bits (which the receiver ignores).

(U) Before we describe the signal detector modifications needed to detect the signal structure of the present invention, the design of a conventional signal detector before it is modified will be described. First, we describe a conventional correlator for detecting a single code block, then a typical 'extended correlator' for detecting a sequence of repeated blocks.

(U) To quickly detect the time of arrival of a known code sequence, a "parallel correlator" such as illustrated in FIG. 15 is typically used. "Parallel" refers to the ability to evaluate many possible times of arrival concurrently, or "in parallel".

(U) The known code sequence, or "reference code" is generated by a code generator similar to that used by the transmitter, and is loaded (shifted) into the code register 21 "off line", that is, prior to the detection process. During the detection process, the reference code remains stationary in the code register 21 while samples of the received signal are shifted into and through the signal register 22, which holds a recent portion of the received code sequence of a length equal to the reference code sequence. As the received code shifts through the signal register 22, it continually changes its alignment with respect to the reference code in the code register 21; and with each shift, each alignment is evaluated by a dot product computation 23. The dot product of the received code and the reference code is a sum of products, each product being one of the bits in the code register 21 times the received signal sample aligned opposite to it in the signal register 22. The computed dot product (the correlation output) is at a maximum when the received code is the most similar to the reference code, thus indicating the precise arrival of the received code.

(U) There are varieties of parallel correlators. One kind shifts the reference code during the correlator process, rather than the received signal. But that kind cannot be adapted to the signal structure of the present invention. Correlators typically used for GPS signals use quadrature samples of the received signal, that is, bit samples taken at two phases of the radio carrier frequency that differ by 90 degrees of phase. Such correlators typically also sample the received signal at twice the bit rate. The combination of quadrature and double-rate sampling provides four samples per received bit, and each of these four samples must be multiplied by the same reference code bit, with the four resulting products contributing to four different dot products. This assures that the received code can be detected even when the carrier phase is not correctly aligned and when the sample timing is not correctly aligned with the received bit timing.

(U) In summary, a parallel correlator such as illustrated in FIG. 15 can detect the arrival of one code block. The anticipated code block is first loaded into the code register 21. At the moment when the last bit of the code block arrives, the received code will be in the signal register 22 in an alignment that matches the code already in the code register 21. The dot product computation measures the degree of matching, and thus detects the moment of arrival. It is well known that this detection process tolerates a considerable amount of noise (such as jamming). As a general rule, twice as much noise power can be tolerated by making the code block (and the correlator) twice as long.

(U) When a code block is repeated, and the receiver anticipates (knows) the exact time intervals between the repeated blocks, an extended correlator 30 can be constructed as shown in FIG. 16. This figure shows an arrangement for detecting a sequence of five code blocks, using one correlator that detects one block at a time. This arrangement can tolerate five times as much noise as a single correlator, but generally costs less than a correlator that is five times longer.

(U) The delays are adjusted to match the time differences between the start of one block and the start of the next. The output of the correlator 30 is shifted through the delay circuits 31-34. When the last bit of the last block arrives, the correlator output will be at a maximum, and the maximum outputs from the previous blocks will delayed such that all maximums appear as inputs to the sum circuit 35 at the same time, which computes the sum of these maximums. Given that the delays vary randomly, at all other times no more than one maximum will appear at the sum input. Thus, the greatest sum will indicate the most likely time of arrival.

(S) An enemy receiver will not be able to anticipate a code block, given that it is secretly and randomly varied, but can nonetheless detect a pair of repeated code blocks by using a parallel correlator that is configured to use previous received data in place of a reference code. The signal structure of the present invention cannot be detected this way by an enemy receiver, but requires the correlator of the authorized receiver to be modified. In short, secret data is needed to allow the correlation process to operate.

(S) In the above description of the signal structure, we discussed the simple case of a two-block structure as a preliminary to the more complex multiple-block structure. For similar reasons, we will here describe the secure detection process for the simpler two-block structure before we proceed to the multiple-block detection process.

(S) Detection of a randomly permuted and dispersed orthogonal pair of blocks can be accomplished by the modified extended correlator 40 shown in FIG. 17. This figure illustrates a small example of a code block that is constructed from two random 4-bit component codes which have been permuted into an 8-bit block, then dispersed with 8 more non-repeated random bits, making a total length of 16 bits in each of the two blocks.

(S) A signal register must be 16 'bits' long in this case. There may be four samples for each 'bit', as discussed earlier. In this case, everything that we describe here must be duplicated four-fold, although this is not indicated in the figure. A reference register (code register) needs to store not only the secret reference code, but also the secret bits that specify the random permutations. The signal register and the reference register appear as block 41 in FIG. 17.

(S) The first layer of permutation (the Y-shaped signal paths in FIG. 17) selects the bits in the signal register that are secretly known to be repeated bits, and ignores the non-repeated bits. (Since half of the bits are discarded, only half of the permutation is actually implemented here, so selection is a more accurate description than permutation.) Each 'Y' in the figure represents the selection of one of two bits in the signal register, controlled by a bit in the reference register. This separates the 8 repeated bits from the 8 non-repeated bits, using 8 secret selection control bits.

(S) The second layer of permutation (the overlapping X-shaped signal paths in the figure) is made of 4 swap circuits, which randomly swap bits in the left and right halves of the signal register, using 4 secret permutation control bits.

(S) The select and permute layers thus direct 4 of the 16 bits of the signal register to the dot product circuit 42 shown on the left, and direct another 4 bits of the signal register to the dot product circuit 43 shown on the right. Each of these 4 bits is one of the component codes (A1 and A2) that have been re-assembled from the received data using secret data known only to authorized receivers.

(S) The dot product circuits 42, 43 separately detect the A1 and A2 component codes. They must be detected separately because the polarities may or may not differ. On the left, the two dot products are summed 44, which provides a maximum when the first block is received. On the right, the two dot products are subtracted 45, which provides a maximum when the second block is received. If the delay 46 has been adjusted to the secret time difference between the two blocks, the maximum from the first block will appear at the output of the delay exactly when the maximum from the second block is computed. The final sum 47 adds these two maximums.

(S) The modified parallel correlator shown in FIG. 18 detects 8 blocks of 256 bits each, where each block is dispersed over 512 bits. That is, this detector detects the code structure shown in FIG. 12, which is the same code structure generated by the code generator 13 shown in FIG. 14. Other sizes can be chosen, but these sizes are used here for the purpose of illustration.

(S) The signal register must be 512 'bits' long in this case. There may be four samples for each 'bit', as discussed earlier. In this case, everything that we describe here must be duplicated four-fold; although this is not indicated in FIG. 18. The code register (reference register) needs to store not only the secret reference code, but also the secret bits that specify the random permutations. In this case, the reference code (also called repeated bits) is 256 bits. As will be seen shortly, the code register also must store 32×8=256 selection control bits and 32×12=384 permutation control bits. The signal register and the code register appear as block 51 in FIG. 18.

(S) The first layer of 'permutation' (actually, selection, as explained earlier) is represented by a row of 32 "S" boxes. Each "S" box processes 16 of the 'bits' in the signal register, selecting the 8 bits that are repeated bits, and ignoring the 8 non-repeated bits, using 8 secret selection control bits for each "S" box.

(S) The second layer of permutation is represented by a row of 32 "P" boxes. Each "P" box permutes the 8 bits from the "S" box immediately above it. The permutation here is the inverse of that shown in FIG. 14, with the downward flow here corresponding to right-to-left (backward) flow in FIG. 14. The permutation of 8 bits is done by three layers of randomly-controlled swaps, followed by a fixed permutation. Twelve secret permutation control bits are needed for each "P" box.

(S) The output of the selection and permutation layers is 32 groups of 8 bits each. Each group corresponds to a column of FIG. 12. At the moment that the last bit of a code block arrives in the signal register, these bits will align perfectly with matching reference code bits in the code register. The dot product computations will detect this alignment. But before the bits are processed by the dot product circuits 53, they must be re-organized in 8 groups of 32 bits each, that is, in groups corresponding to rows of FIG. 12. Mathematically, this is called a matrix transpose 52, as labeled in the figure, but physically is just a wiring pattern that delivers the data to the right circuits.

(S) The eight dot product circuits 53 separately detect the eight 32-bit component codes. (Each component code is represented by a 32-bit row in FIG. 12.) Each dot product circuit 53 will produce a maximum output when the corresponding component code is arrives in its aligned position. The maximum will be positive or negative depending on whether the polarity of the component code was reversed by the polarity logic of the code generator (the Hadamard matrix pattern).

(S) The polarity patterns are decoded by a Walsh transform, a process equivalent to multiplying by a Hadamard matrix. This process is shown by X-shaped data flows in the figure. The data flow pattern is the same as that used in a Fast Fourier Transform (FFT), where each "X" is called a "butterfly". The two small circles 54 shown at the bottom of each "X" represent a pair of add/subtract circuits (one circle is an adder, and the other a subtractor). That is, if the two inputs of a Walsh butterfly are A and B, then the outputs are A+B and A-B.

(S) The Walsh transform produces eight outputs; so, unlike an ordinary parallel correlator with one output that detects one code block, this modified parallel correlator 50 has eight outputs that detect eight different code blocks, namely, the eight kinds of code blocks that the transmitter generates. Although we have added additional circuits to the ordinary parallel correlator, we have not made it eight times larger; so that this detector design is more efficient than eight ordinary parallel correlators (one for each kind of code block).

(S) The correlator 50 can be extended (as in FIG. 16) by delay and adder circuits 55, 56 as shown at the bottom of the figure, to detect a sequence of blocks with (secretly) known timing gaps between the blocks. The correlator outputs are applied here in the sequence anticipated for the block sequence, with the delays adjusted according to the anticipated block timing, so that the maximums of the correlator outputs will be simultaneous when added. Small circles 56 where data paths merge indicate the additions.

(S) However, we have included squaring functions 57 in FIG. 18, to illustrate how (typically) to deal with the problem of coherency that often occurs. We have been assuming that the carrier phase is sufficiently stable during the reception of each code block to provide a consistent polarity of the received code. That is, it has been assumed that all of the parts of a received code block have the same relative polarities as when the code block was transmitted. When this assumption is true, the detection can be coherent. However, as we try to detect larger patterns (such as an entire block sequence, as opposed to just one block at a time), it is often the case that carrier phase variations cannot be sufficiently limited for such long intervals. In such a case, the receiver cannot detect whether the polarity of the maximum correlation of the last code block is positive or negative relative to the maximum correlation of the first code block. Squaring allows the detector to observe the maximums while ignoring the polarities: FIG. 18 illustrates the case that two adjacent blocks are close enough to be detected coherently (with squaring), but that blocks with more time separation that this must be detected non-coherently (with squaring). Therefore, pairs of adjacent correlator outputs are delayed and added before squaring, and the remainder of the delays and additions are done after squaring.

(S) It is possible that some receivers (of the same transmitted code) may have a greater need for tolerance of jamming noise than other receivers. It has been noted that longer codes increase this noise tolerance, and the cost for obtaining this strength is a longer correlator. In such a situation, some receivers can be made stronger (at greater cost) than other receivers, although all receivers use the same transmitters (and the same code structure). The transmitted code can be made long enough for the needs of the strongest receiver; and reduced-cost receivers can be designed that detect only part of the block sequence. Partial detection allows removal of parts of the modified correlator that are not needed to detect the chosen blocks.

(U) Most of the design variations that are applied to ordinary correlators, and various search strategies for processing the correlator outputs can also be applied to the modified correlator design described here.

(U) It is, of course, possible to embody the invention in specific forms other than those described above without departing from the spirit of the invention. Thus, the embodiments described above are merely illustrative and should not be considered restrictive in any way. The scope of the invention is determined by the following claims, rather than the preceding description, and all variations and equivalents which fall within the scope of the claims are intended to be embraced therein.

I claim:

1. A method for generating a signal in a device including processing circuitry, the method comprising the steps of:
    forming, in the processing circuitry, a plurality of blocks including a first block and a second block from sequences of components A0 and A1, each of components A0 and A1 being of N bits, respectively, the first block including components A0 and A1 and the second block including components A0 and –A1;
    forming, in the processing circuitry, at least a pair of sequences from components B0 and B1, each of B0 and B1 being of 2N bits, respectively;
    including the pair of sequences from components B0 and B1 in the first block and the second block, respectively;
    permuting, in the processing circuitry, the components A0, A1 of the first block with the component B0;
    permuting, in the processing circuitry, the components A0, –A1 of the second block with the component B1;
    generating a signal in the processing circuitry; and
    embedding, in the processing circuitry, the first and second permuted blocks in the generated signal.

2. A method according to claim 1, wherein the step of permuting the components A0, A1 of the first block with component B0 includes swapping at least one of the respective N bits of the components A0, A1 of the first block with at least one of the bits of the component B0, based on an output of a random number generator, and
    wherein the step of permuting the components A0, –A1 of the second block with the component B1 includes swapping one of the respective N bits of the components A0, –A1 of the second block with the component B1, based on the output of the random number generator.

3. A method according to claim 2, comprising:
    performing a fixed permutation before the permuting steps.

4. A method according to claim 2, wherein the polarities of the components A0 and A1 correspond to the polarities of a Hadamard matrix.

5. A method according to claim 2, comprising:
    forming a third block that includes a component A2;
    forming a component B2; and
    permuting the third block with the formed component B2.

6. A method according to claim 5, comprising:
    forming a fourth block that includes a component A3;
    forming a component B3; and
    permuting the fourth block with the formed component B3.

7. A method according to claim 6, wherein the polarities of the components A0, A1, A2 and A3 in each of the four blocks correspond to the polarities of a Hadamard matrix.

8. A method according to claim 6, comprising:
    forming fifth, sixth, seventh and eighth blocks that respectively include components A4, A5, A6 and A7;
    forming components B4, B5, B6 and B7; and
    permuting the components B4, B5, B6, and B7 with the fifth, sixth, seventh, and eighth blocks, respectively.

9. A method according to claim 8, wherein the polarities of the components A0, A1, A2, A3, A4, A5, A6 and A7 in each of the eight blocks correspond to the polarities of a Hadamard matrix.

10. A method according to claim 1, wherein the signal comprises one of a ranging signal for a positioning system and a synchronization preamble.

11. The method according to claim 1, wherein the components A0, A1, B0, and B1 are based on an output of a random number generator, and
    wherein the steps of permuting are based on the output of the random number generator.

12. A method for generating a signal in a device including processing circuitry, the method comprising the steps of:
    forming, in the processing circuitry, a plurality of blocks 0 through i, where i is an integer, from sequences of components A0 to Ai, each of the components being N bits, each block including A0 through Ai components;
    forming, in the processing circuitry, a plurality of sequences from components B0 through Bi, where i is an integer, each of N*i bits, respectively, the polarities of the components A0 through Ai in blocks 0 to i corresponding to the polarities of a Hadamard matrix;

permuting, in the processing circuitry, components A0 through Ai of each block respectively with components B0 through Bi; and embedding, in the processing circuitry, the permuted blocks 0 through i in a signal.

13. A method according to claim 12, comprising:
performing a fixed permutation before the permuting step.

14. A method according to claim 12, wherein the signal comprises one of a ranging signal for a positioning system and a synchronization preamble.

15. The method according to claim 12, wherein the components A0 through Ai and B0 through Bi are based on an output of a random number generator, and
wherein the step of permuting is based on the output of the random number generator.

16. An apparatus for embedding a data structure having at least a pair of blocks in a signal, comprising:
a data source for generating data and a default code based upon a cryptographic algorithm;
a block timing generator, responsive to the data source, for generating a block control signal;
an acquisition code generator, responsive to the data source, the block control signal, and the default code, for generating an acquisition code; and
a code multiplexer, responsive to the acquisition code, the default code and the block timing generator, for providing the data structure.

17. An apparatus according to claim 16 wherein the acquisition code generator includes:
a first shift register and a memory fill control that each receive a plurality of bits from the data source;
a code memory and a permutation memory, each receiving a plurality of the bits from the memory fill control, and each being responsive to the block timing generator;
polarity logic, responsive to the block timing generator, for imposing polarities corresponding to a Hadamard matrix upon the output of the code memory;
permutation logic, responsive to the output of the polarity logic and the permutation memory, for permuting the output of the polarity logic and dispersing the output of the polarity logic among non-repeated output bits of the shift register; and
a second shift register, responsive to the output of the permutation logic, for shifting the output of the permutation logic.

18. The apparatus according to claim 17, wherein the data source is the output of a random number generator,
wherein the default code and the generated data are based on the output of the random number generator, and
wherein the permuting is based on the output of the random number generator.

19. An apparatus according to claim 16, wherein the signal comprises one of a ranging signal for a positioning system and a synchronization preamble.

20. An apparatus for detecting a data structure having at least a pair of blocks embedded in a signal, the apparatus comprising:
a signal and reference register for storing the signal having the data structure of the blocks;
means for selecting from the stored signal only repeated bits of the data structure which are known by the apparatus to be repeated;
swapping circuits for swapping the selected bits, such that selected bits in a first portion of the signal and reference register are swapped with selected bits in a second portion of the signal and reference register;
means for detecting at least a first pair of blocks from the swapped bits;
means for summing the first block with the second block; and
means for subtracting the second block from the first block.

21. An apparatus according to claim 20, comprising:
means for delaying the first block with respect to the second block; and
means for summing the delayed first block with respect to the second block.

22. The apparatus according to claim 20, wherein the swapping circuits swap based on the output of a random number generator.

23. An apparatus for detecting a data structure having multiple pairs of blocks embedded in a signal, the apparatus comprising:
a signal and reference register for storing the signal having the data structure of the blocks;
means for selecting from the stored signal only repeated bits of the data structure which are known by the apparatus to be repeated;
swapping circuits for swapping the selected bits in layers;
means for performing a fixed permutation on the swapped bits; and
means for performing a Walsh transform on the permuted bits in order to decode the polarities of the permuted bits.

24. An apparatus according to claim 23, comprising a first plurality of delay circuits for detecting a sequence of blocks having a delay between the blocks.

25. An apparatus according to claim 24, comprising:
a plurality of squaring circuits configured to square at least the outputs of the delay circuits, respectively; and
second delay circuits configured to delay the outputs of at least one of the squaring circuits.

26. The apparatus according to claim 23, wherein the swapping circuits swap based on the output of a random number generator.

27. An apparatus for generating a signal, the apparatus comprising:
first circuitry configured to form a plurality of blocks 0 through i, where i is an integer, from sequences of components A0 to Ai, each of the components being N bits, each block including A0 through Ai components;
second circuitry configured to form a plurality of sequences from components B0 through Bi, where i is an integer, of N*i bits, respectively, the polarities of the components A0 through Ai in blocks 0 to i corresponding to the polarities of a Hadamard matrix;
third circuitry configured to permute components A0 through Ai of each block respectively with components B0 through Bi; and
fourth circuitry configured to output the permuted blocks 0 through i in a signal.

* * * * *